(12) United States Patent
Chou

(10) Patent No.: US 8,691,133 B2
(45) Date of Patent: Apr. 8, 2014

(54) RECYCLABLE PLASTIC COMPOSITE WHEEL RIM FABRICATION METHOD

(76) Inventor: Windsor Chou, Taipei (TW)

(*) Notice: Subject to any disclaimer, the term of this patent is extended or adjusted under 35 U.S.C. 154(b) by 341 days.

(21) Appl. No.: 13/278,235

(22) Filed: Oct. 21, 2011

(65) Prior Publication Data
US 2013/0098538 A1  Apr. 25, 2013

(51) Int. Cl.
*B29C 70/40* (2006.01)
*B29C 70/52* (2006.01)

(52) U.S. Cl.
USPC .................................. 264/257; 301/64.703

(58) Field of Classification Search
USPC .......... 264/257, 258; 156/166, 180, 242, 245; 301/64.703
See application file for complete search history.

(56) References Cited

U.S. PATENT DOCUMENTS

| | | | |
|---|---|---|---|
| 4,583,933 A * | 4/1986 | Woelfel et al. | 425/330 |
| 4,832,414 A * | 5/1989 | Jones | 301/64.703 |
| 5,045,261 A * | 9/1991 | Weeks | 264/108 |
| 5,985,072 A * | 11/1999 | Finck et al. | 156/184 |
| 2005/0104441 A1 * | 5/2005 | Bertelson | 301/64.703 |

FOREIGN PATENT DOCUMENTS

| | | | |
|---|---|---|---|
| EP | 1905572 A1 * | 4/2008 | |
| GB | 2112700 A * | 7/1983 | |
| JP | 59-32503 A * | 2/1984 | |

* cited by examiner

*Primary Examiner* — Jeff Aftergut
(74) *Attorney, Agent, or Firm* — Rosenberg, Klein & Lee

(57) ABSTRACT

A recyclable plastic composite wheel rim fabrication method includes the steps of: (a) preparing a triaxle or biaxle composite fabric, (b) coating the composite fabric with a layer of plastic material to form a composite substrate, (c) processing the composite substrate into a composite plate member by means of roller pressing, dipping, bake-drying and cutting, (d) stamping the composite plate member into a blank wheel rim by means of a hot press, (e) cooling the blank wheel rim and trimming it to remove to remove blurs and defective selvedge, and (f) polishing the surface of the blank wheel rim to obtain a finished wheel rim.

11 Claims, 9 Drawing Sheets

RECYCLABLE PLASTIC COMPOSITE WHEEL RIM FABRICATION METHOD

BACKGROUND OF THE INVENTION

1. Field of the Invention

The present invention relates to wheel rim fabrication technology and more particularly, to a method of making a wheel rim using a recyclable plastic composite material.

2. Description of the Related Art

Conventional wheel rims are commonly made of a metallic material, for example, iron or aluminum alloy. A wheel rim made of iron is heavy and inexpensive, however it may deformed easily. An aluminum alloy wheel rim is relatively lighter than an iron wheel rim and not easily deformable, however it is expensive. As conventional wheel rims, either made of iron or aluminum alloy, have a certain weight, a gasoline-powered vehicle or electrical vehicle using conventional metal wheel rims consumes much fuel energy or electrical power.

As fuel energy is getting short and gasoline price keeps increasing, vehicle manufacturers keep investing a big amount of capital in creating high strength and light weight materials to reduce vehicle weight. Hybrid and electrical vehicles have also been continuously created to serve people. However, the endurance of existing electrical vehicles is still not satisfactory. In order to reduce the consumption of fuel oil or electrical power, it is necessary to reduce the weight of the vehicle. All vehicle manufacturers are trying hard to reduce the weight of the vehicle body in order to reduce the consumption of fuel oil or electrical power.

SUMMARY OF THE INVENTION

The present invention has been accomplished under the circumstances in view. It is one object of the present invention to provide a recyclable plastic composite wheel rim fabrication method, which is practical for making a high-strength, light-weight, reclaimable composite wheel rim.

To achieve this and other objects of the present invention, a recyclable plastic composite wheel rim fabrication method includes the steps of preparing a triaxle or biaxle composite fabric, coating the composite fabric with a layer of recyclable plastic material to form a composite substrate, processing the composite substrate into a composite plate member by means of roller pressing, dipping, bake-drying and cutting, stamping the composite plate member into a blank wheel rim by means of a hot press, cooling the blank wheel rim and trimming it to remove to remove blurs and defective selvedge, and polishing the surface of the blank wheel rim to obtain a finished wheel rim.

DETAILED DESCRIPTION OF THE PREFERRED EMBODIMENT

Figure 1:
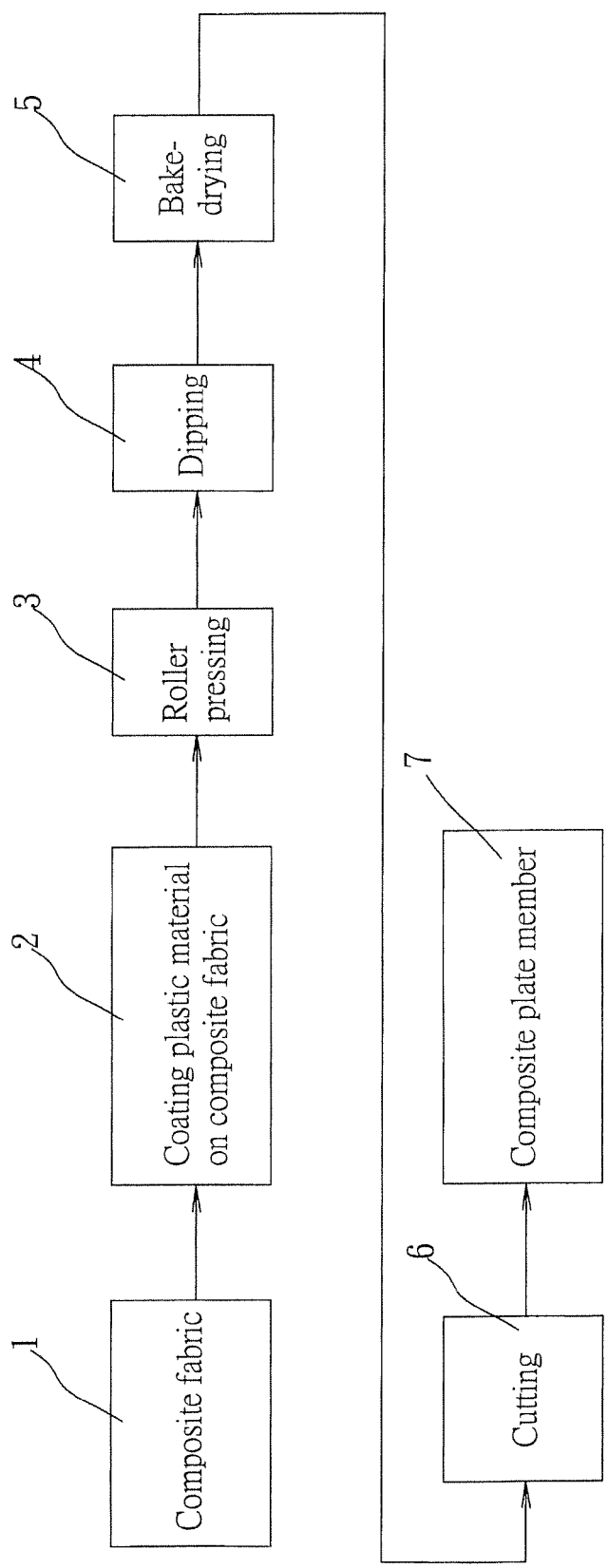
FIG. 1 is a recyclable plastic composite plate fabrication flow chart in accordance with a first embodiment of the present invention.
Figure 2:
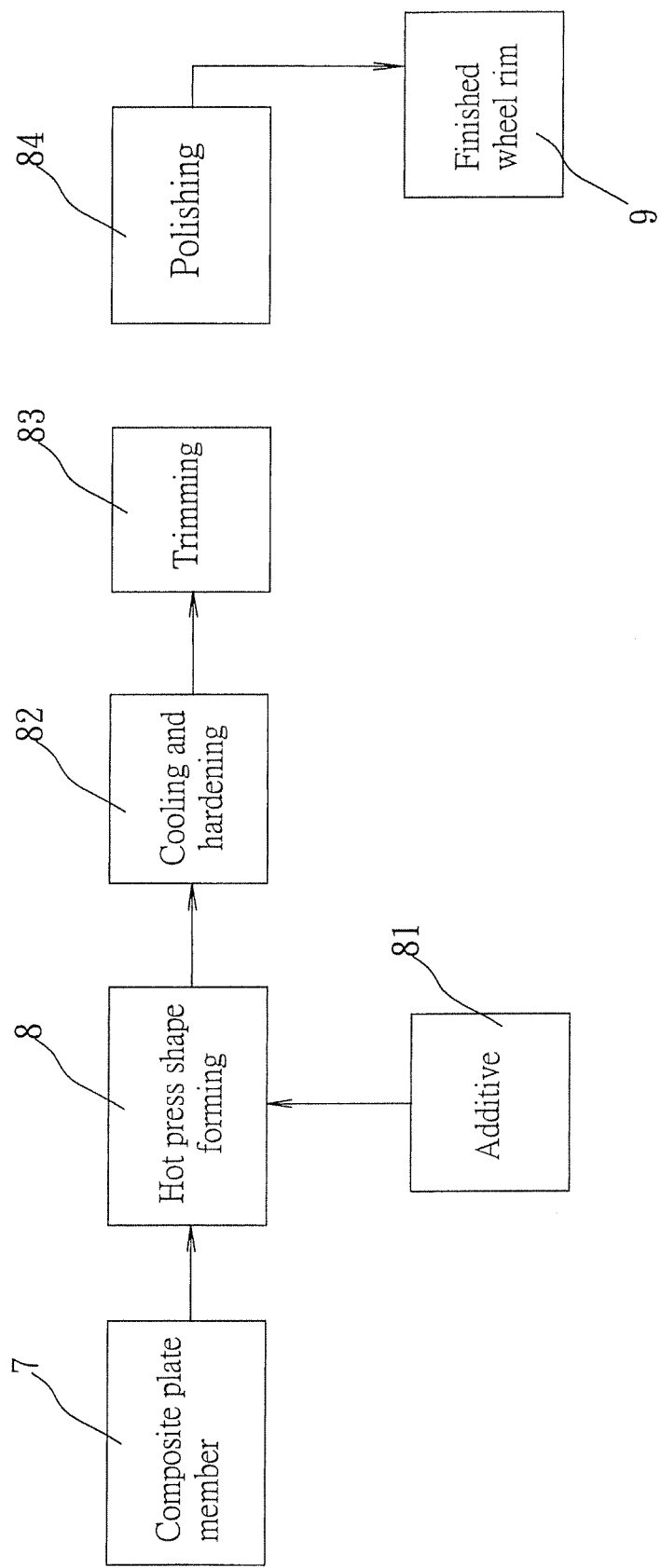
FIG. 2 is a recyclable plastic wheel rim fabrication flow chart in accordance with the present invention.

Referring to FIGS. 1 and 2, a recyclable plastic composite wheel rim fabrication method in accordance with a first embodiment of the present invention includes the following steps:

(a) preparing a triaxle or biaxle composite fabric 1, such as glass fiber fabric, carbon fiber fabric or Kevlar fabric;

(b) coating opposing top and bottom surfaces of the composite fabric 1 with a layer of recyclable plastic material 34 for enabling the composite fabric 1 and the recyclable plastic material 34 to be bonded 2 together to form a composite substrate;

(c) processing the composite substrate into a composite plate member 7 through a series of processing processed including roller pressing 3, dipping 4, bake-drying 5 and cutting 6;

(d) stamping the composite plate member 7 into a blank wheel rim by means of a hot press to enhance material density and strength;

(e) cooling the blank wheel rim in a cooling rack to have the blank wheel rim become hardened;

(f) trimming the blank wheel rim to remove to remove blurs and defective selvedge; and (g) polishing the surface of the blank wheel rim, thereby obtaining a finished wheel rim 9.

Further, an additive 81, such as ceramic powder or metal power may be added to the composite plate member when stamping the composite plate member into a blank wheel rim by means of a hot press. Further, the recyclable plastic material can be selected from the group of PE, PP, PS, ABS, PET, ACRYLIC, POLYIMIDE, plastic PU and nylon.

Figure 3:
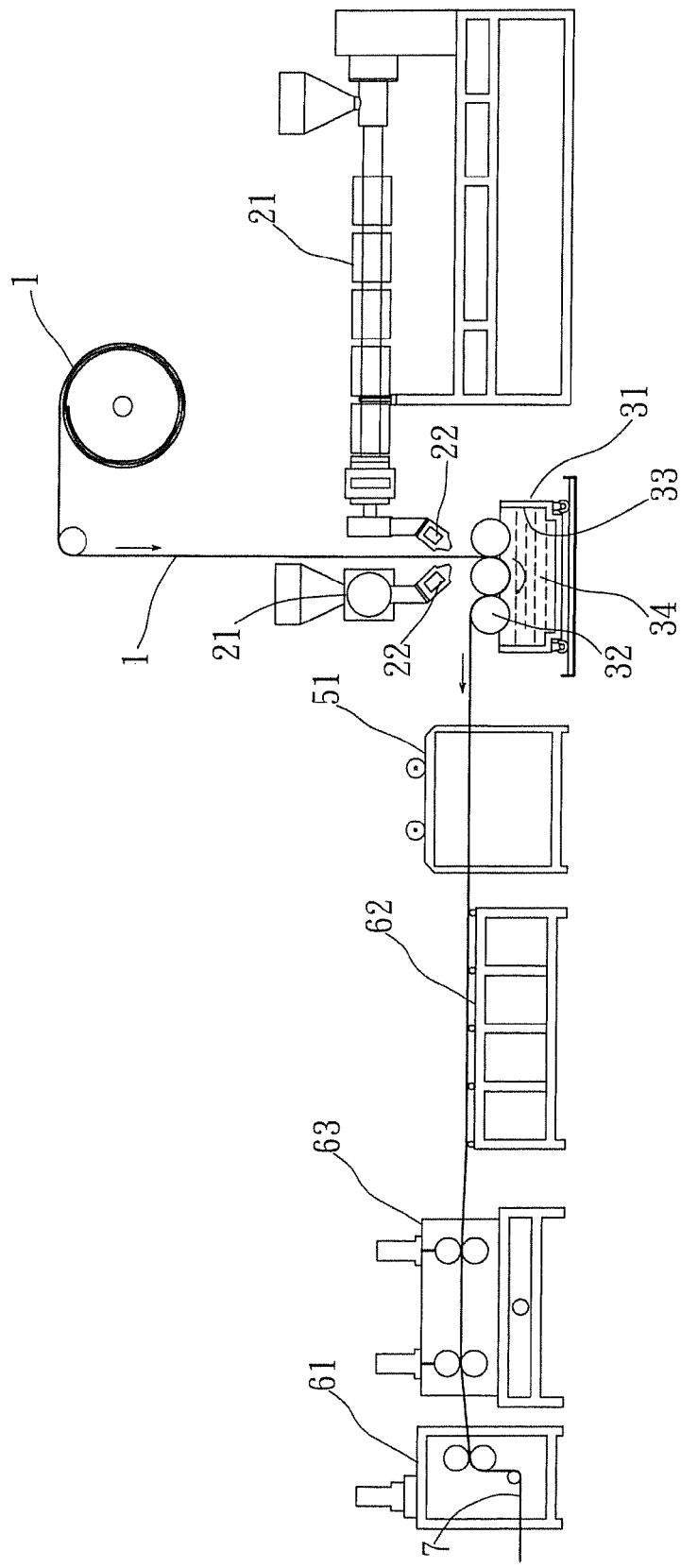
FIG. 3 is a schematic side view of a recyclable plastic composite wheel rim fabrication system in accordance with the present invention.
Figure 4:
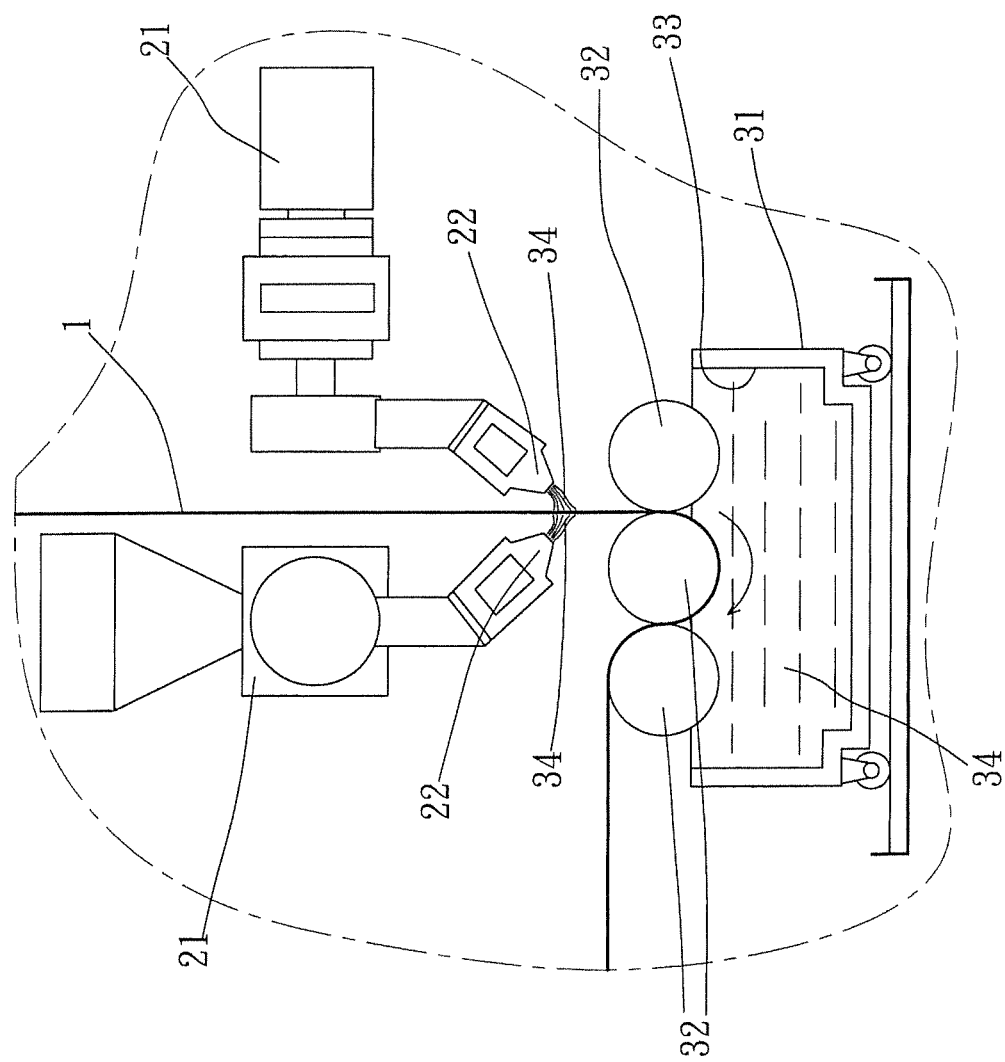
FIG. 4 is a top view, in an enlarged scale, of a part of the recyclable plastic composite wheel rim fabrication system in accordance with the present invention.
Figure 5:
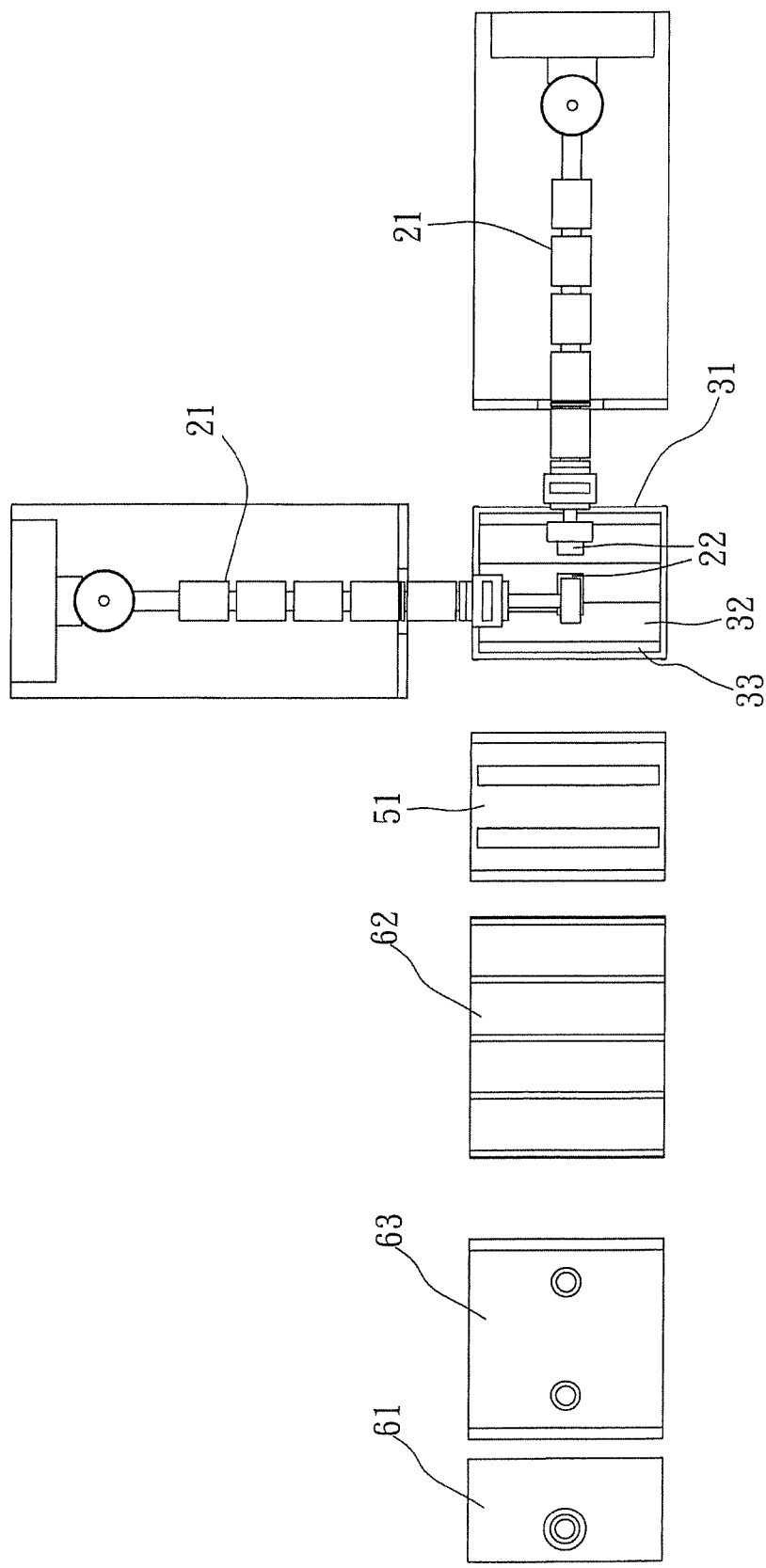
FIG. 5 is another partial top view of the recyclable plastic composite wheel rim fabrication system in accordance with the present invention.
Figure 6:
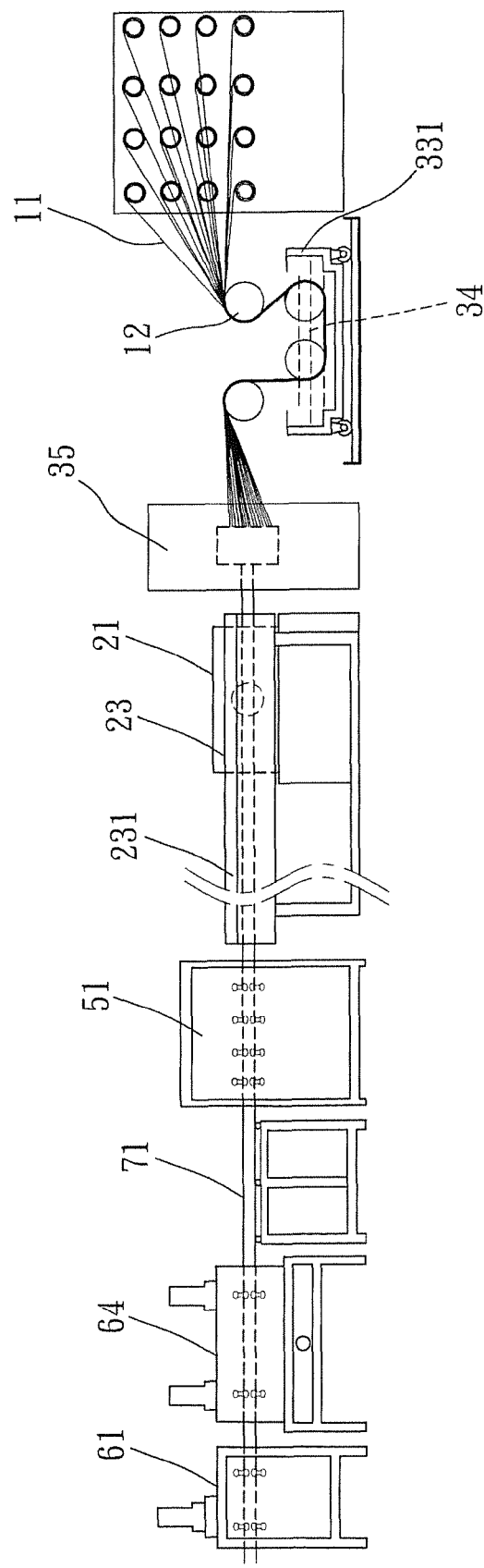
FIG. 6 illustrates an alternate form of the recyclable plastic composite wheel rim fabrication system in accordance with the present invention.
Figure 7:
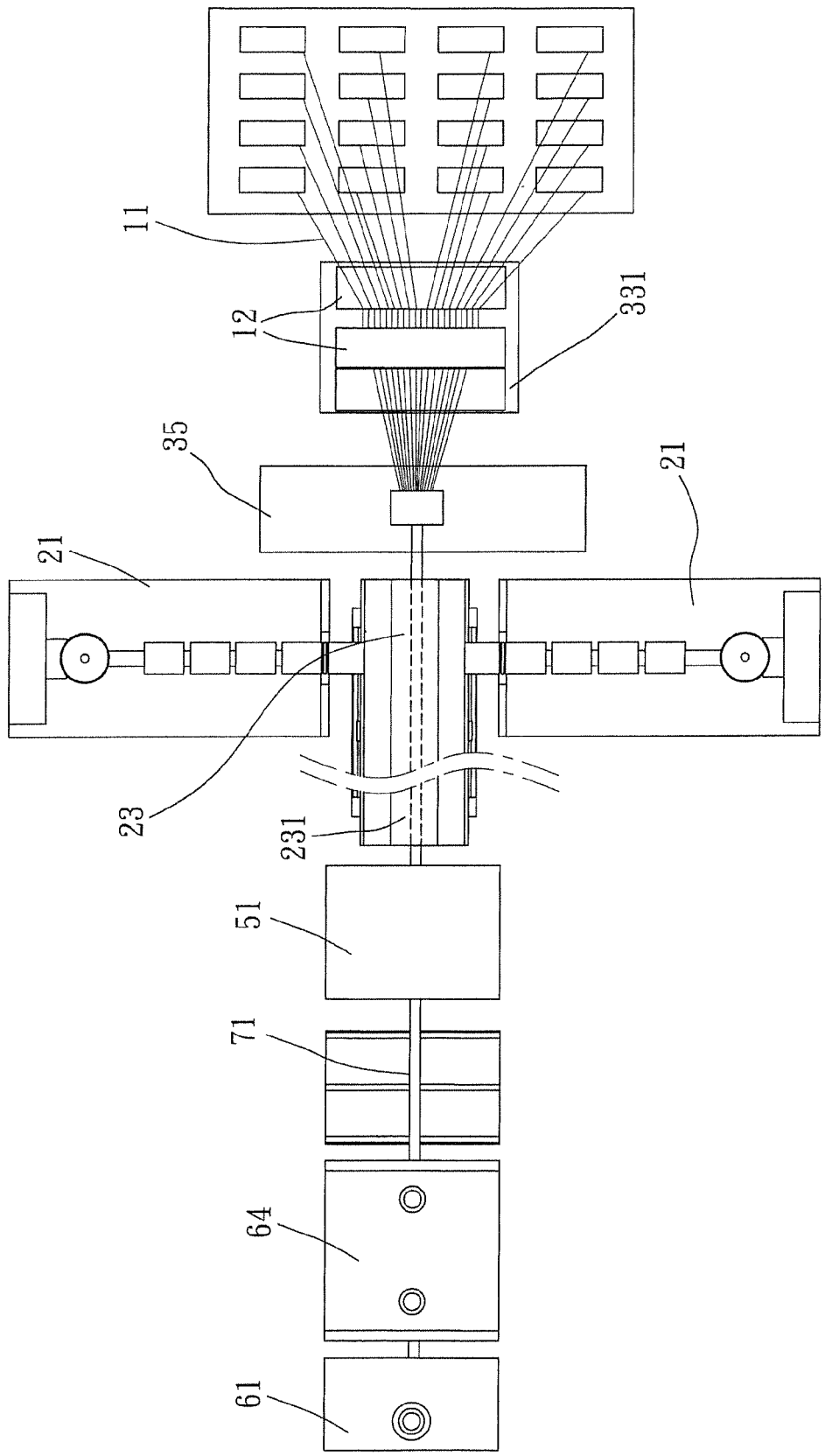
FIG. 7 is a top view of the recyclable plastic composite wheel rim fabrication system shown in FIG. 6.
Figure 9:
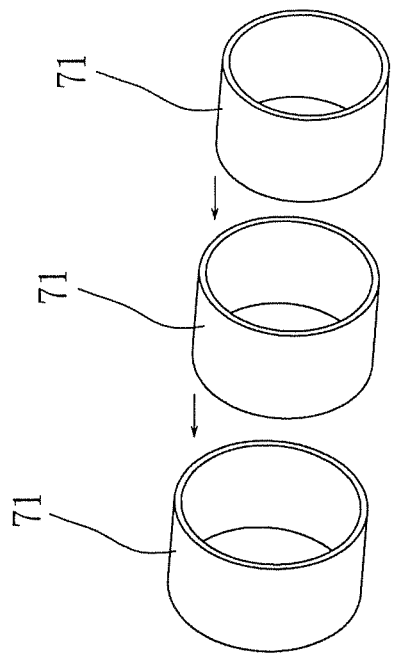
FIG. 9 is a schematic exploded view illustrating composite tube components attachable one into another before stamping.
Figure 10:
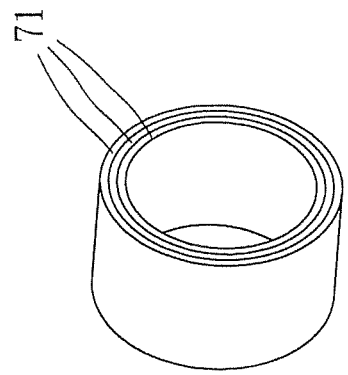
FIG. 10 corresponding to FIG. 9, illustrating the recyclable plastic composite tube components attached one into another.

Referring to FIGS. 3, 4 and 5 and FIGS. 1 and 2 again, the prepared triaxle or biaxle composite fabric 1 is delivered through the gap in between the nozzles 22 of two squeeze feeders 21, enabling the opposing top and bottom surfaces of the triaxle or biaxle composite fabric 1 to be respectively coated with a layer of a recyclable plastic material 34. The composite substrate thus obtained is transferred through rollers 32 in a dipping trough 33 of a dipping machine 31, enabling the composite substrate to be coated with the same recyclable plastic material 34 at a second time. The continuous sheet of the composite substrate is continuously transferred forwards from the dipping machine 31 to a bake-drying machine 51 for drying, and transferred through a rack 62 for cooling, and then transferred through a drag machine 63 and then cut by a cutting machine 61 into the desired size of composite plate member 7. The composite plate member 7 thus obtained is then stamped into a blank wheel rim by means of a hot press 8 to enhance material density and strength. The blank wheel rim thus obtained is then cooled down and hardened 82, and then trimmed to remove to remove blurs and defective selvedge 83, and then polished 84, and a high-strength, light-weight reclaimable wheel rim 9 is thus obtained.

Referring to FIGS. 6-11, a recyclable plastic composite wheel rim fabrication method in accordance with a second embodiment of the present invention includes the following steps:

(a) preparing threads 11 from the group of glass fibers, carbon fibers and Kevlar fibers;

(b) using pulling rollers 12 to deliver the prepared threads 11 through a recyclable plastic material 34 in a dipping trough 331 for enabling the threads 11 to be coated with a layer of the recyclable plastic material 34;

(c) using a weaving machine 35 to weave the recyclable plastic material 34 coated threads 11 into tubular fabrics;

(d) feeding the tubular fabrics into an extrusion molding machine 23 and simultaneously filling a recyclable plastic material 34 into the extrusion molding machine 23 by means of a squeeze feeder 21, enabling the tubular fabrics to be molded with the supplied recyclable plastic material 34 into tubular composite materials of different diameters;

(e) processing the tubular composite materials through roller pressing 231 and bake-drying machine 51 and then cutting machine 61 the tubular composite materials into composite tubes 71 of different diameters into desired composite tube components subject to a predetermined length;

(f) attaching the composite tube components one into another and then stamping the composite tube components into blank wheel rims by means of a hot press;

(g) trimming the blank wheel rims and making holes on the blank wheel rims; and (h) polishing the blank wheel rims, thereby obtaining the desired finished wheel rims.

Figure 8:
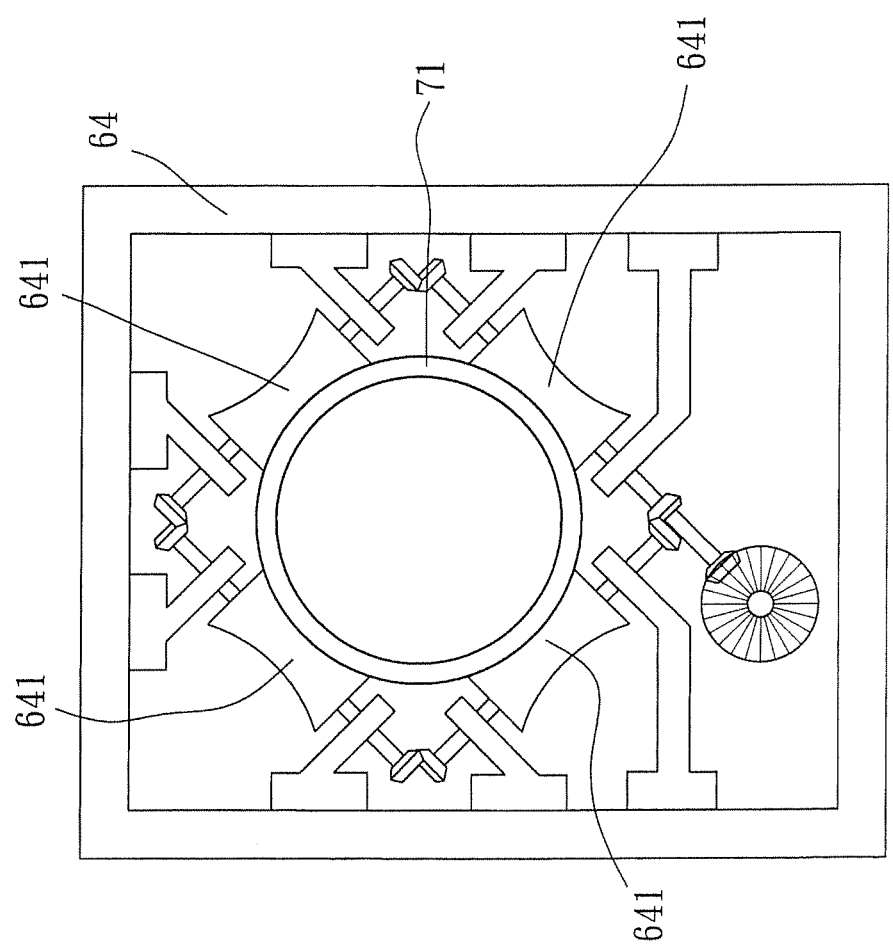
FIG. 8 illustrates the arrangement of the internal component parts of the roll-pulling machine used in the alternate form of the recyclable plastic composite wheel rim fabrication system in accordance with the present invention.
Figure 11:
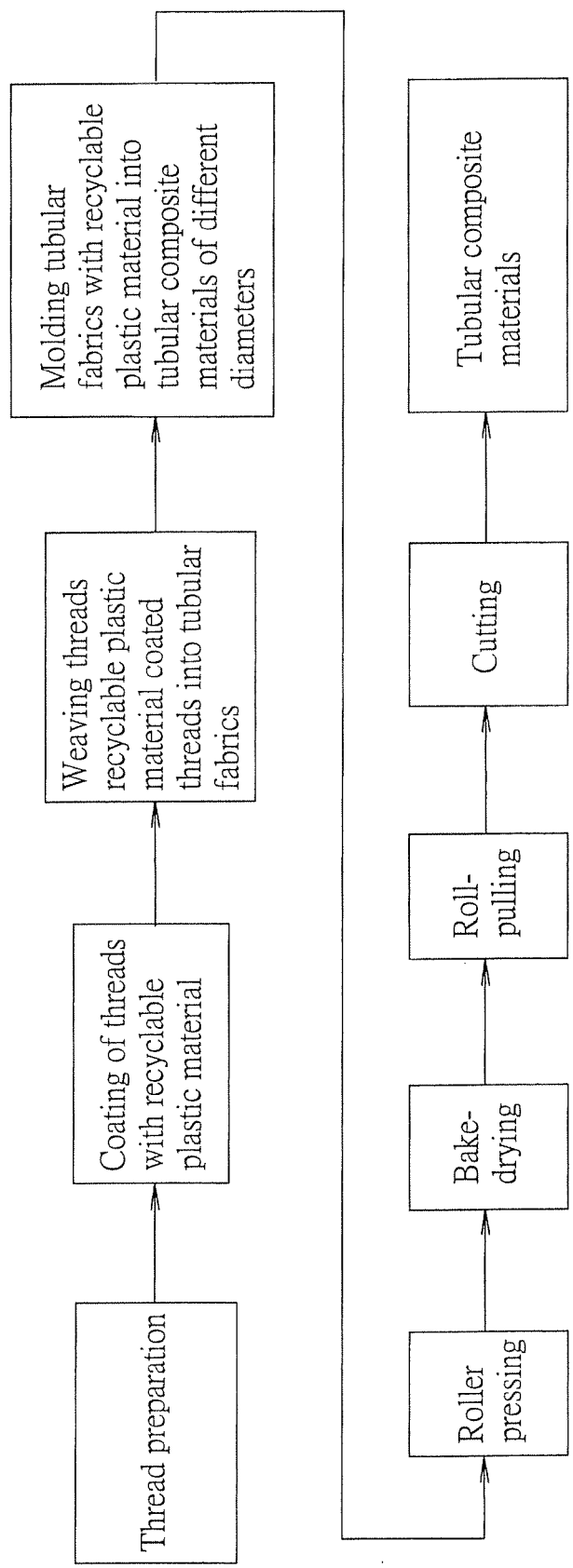
FIG. 11 is a recyclable plastic composite plate fabrication flow chart in accordance with a second embodiment of the present invention.

Further, a roll-pulling machine 64 having multiple pulling rollers 641 is used to pull the composite tubes 71 for processing (see FIG. 8). Further, glass fibers, carbon fibers and Kevlar fibers can be mixed and twisted into threads 11 for dip-coating with the applied recyclable plastic material 34 for enabling the recyclable plastic material 34 coated threads 11 to be woven into a tubular fabric by the weaving machine 35.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A recyclable plastic composite wheel rim fabrication method, comprising the steps of:
   (a) preparing a triaxle or biaxle composite fabric;
   (b) coating opposing top and bottom surfaces of said composite fabric with a layer of recyclable plastic material to form a composite substrate;
   (c) processing said composite substrate into a recyclable plastic composite plate member through a series of processing processed including roller pressing, dipping, bake-drying and cutting;
   (d) stamping said recyclable plastic composite plate member into a blank wheel rim by means of a hot press;
   (e) cooling said blank wheel rim and trimming said blank wheel rim to remove to remove blurs and defective selvedge from said blank wheel rim; and
   (f) polishing the surface of said blank wheel rim, thereby obtaining a finished wheel rim.

2. The recyclable plastic composite wheel rim fabrication method as claimed in claim 1, further comprising a sub step of adding an additive to said recyclable plastic composite plate member when stamping said composite plate member into a blank wheel rim.

3. The recyclable plastic composite wheel rim fabrication method as claimed in claim 2, wherein said additive is selected from the group of ceramic powder and metal powders.

4. The recyclable plastic composite wheel rim fabrication method as claimed in claim 1, wherein said triaxle or biaxle composite fabric is selected from the group of glass fiber fabric, carbon fiber fabric and Kevlar fabric.

5. The recyclable plastic composite wheel rim fabrication method as claimed in claim 1, wherein said recyclable plastic material is selected from the group of PE, PP, PS, ABS, PET, ACRYLIC, POLYIMIDE, plastic PU and nylon.

6. The recyclable plastic composite wheel rim fabrication method as claimed in claim 1, wherein step (b) of coating opposing top and bottom surfaces of said composite fabric with a layer of plastic material to form a composite substrate is done by means of delivering said triaxle or biaxle composite fabric through the gap in between the nozzles of two squeeze feeders, enabling opposing top and bottom surfaces of said triaxle or biaxle composite fabric to be respectively coated with a layer of said plastic material, and then transferring the composite substrate thus obtained through rollers in a dipping trough of a dipping machine for enabling said composite substrate to be coated with the same plastic material at a second time.

7. A recyclable plastic composite wheel rim fabrication method, comprising the steps of:
   (a) preparing threads from the group of glass fibers, carbon fibers and Kevlar fibers;
   (b) using pulling rollers to deliver said threads through a recyclable plastic material in a dipping trough for enabling said threads to be coated with a layer of said recyclable plastic material;
   (c) using a weaving machine to weave the recyclable plastic material coated threads into tubular fabrics;
   (d) feeding said tubular fabrics into an extrusion molding machine and simultaneously filling a recyclable plastic material into said extrusion molding machine by means of a squeeze feeder to have said tubular fabrics to be molded with the supplied recyclable plastic material into tubular composite materials of different diameters;
   (e) cutting said tubular composite materials into desired composite tube components subject to a predetermined length;
   (f) stamping said composite tube components into blank wheel rims by means of a hot press;
   (g) trimming said blank wheel rims and making holes on said blank wheel rims; and
   (h) polishing said blank wheel rims, thereby obtaining desired finished wheel rims.

8. The recyclable plastic composite wheel rim fabrication method as claimed in claim 7, further comprising a sub step of adding an additive to said recyclable plastic composite plate member when stamping said composite plate member into a blank wheel rim.

9. The recyclable plastic composite wheel rim fabrication method as claimed in claim 8, wherein said additive is selected from the group of ceramic powder and metal powders.

10. The recyclable plastic composite wheel rim fabrication method as claimed in claim 7, wherein said recyclable plastic material is selected from the group of PE, PP, PS, ABS, PET, ACRYLIC, POLYIMIDE, plastic PU and nylon.

11. The recyclable plastic composite wheel rim fabrication method as claimed in claim 7, wherein said threads are prepared by mixing glass fibers, carbon fibers and Kevlar fibers together and then twisting the mixed fibers into threads.

* * * * *